(12) United States Patent
Van Pelt

(10) Patent No.: US 9,930,938 B2
(45) Date of Patent: Apr. 3, 2018

(54) FASTENING SYSTEM

(71) Applicant: Henricus Leonardus Gerardus Van Pelt, Veldhoven (NL)

(72) Inventor: Henricus Leonardus Gerardus Van Pelt, Veldhoven (NL)

(73) Assignee: Henricus Leonardus Gerardys Van Pelt, Veldhoven (NL)

( * ) Notice: Subject to any disclaimer, the term of this patent is extended or adjusted under 35 U.S.C. 154(b) by 0 days.

(21) Appl. No.: 15/300,889

(22) PCT Filed: Apr. 2, 2015

(86) PCT No.: PCT/NL2015/050210
§ 371 (c)(1),
(2) Date: Sep. 30, 2016

(87) PCT Pub. No.: WO2015/183075
PCT Pub. Date: Dec. 3, 2015

(65) Prior Publication Data
US 2017/0020237 A1 Jan. 26, 2017

(30) Foreign Application Priority Data

Apr. 2, 2014 (NL) ..................................... 1040752

(51) Int. Cl.
*A44B 19/14* (2006.01)
*A44B 17/00* (2006.01)
*B65D 33/25* (2006.01)
*B65D 25/22* (2006.01)
*B65D 33/14* (2006.01)
(Continued)

(52) U.S. Cl.
CPC .......... *A44B 19/14* (2013.01); *A44B 17/0023* (2013.01); *A44B 17/0041* (2013.01); *B65D 25/22* (2013.01); *B65D 33/14* (2013.01); *B65D 33/255* (2013.01); *B65D 33/2558* (2013.01);
(Continued)

(58) Field of Classification Search
CPC . A44B 19/14; Y10T 24/2532; Y10T 24/2534; Y10T 24/3538; B65D 33/2558
See application file for complete search history.

(56) References Cited

U.S. PATENT DOCUMENTS 3,338,285 A 8/1967 Jaster et al.
3,431,605 A * 3/1969 Hasslinger ......... A44B 18/0003
24/402
(Continued)

FOREIGN PATENT DOCUMENTS

EP 0517971 A1 12/1992
FR 2982848 A1 5/2013

OTHER PUBLICATIONS

International Search Report and Written Opinion for International Application No. PCT/NL2015/050210, dated Jul. 14, 2015, 10 pages.

*Primary Examiner* — Robert Sandy
(74) *Attorney, Agent, or Firm* — Steven M. Koehler; Westman, Champlin & Koehler, P.A.

(57) ABSTRACT

A fastening system includes two elongated profile parts, one of which includes a guiding surface or ramp for positioning it with respect to the other profile part, for releasably fastening a carrier to a holder. Deformations of a rib of one profile or a clamping hole of the other profile are adapted to position the one profile in substantially clamped state in the other profile in the longitudinal direction.

16 Claims, 9 Drawing Sheets

(51) Int. Cl.
*B65D 63/10* (2006.01)
*F16B 5/07* (2006.01)

(52) U.S. Cl.
CPC ...... *B65D 63/1018* (2013.01); *B65D 2313/04* (2013.01); *F16B 5/07* (2013.01)

(56) References Cited

U.S. PATENT DOCUMENTS

| | | |
|---|---|---|
| 5,185,909 A | 2/1993 | Inagaki |
| 5,857,586 A | 1/1999 | Scherr |
| 7,743,474 B2 | 6/2010 | May |
| 2003/0033694 A1* | 2/2003 | Cisek ........................ B29D 5/10 24/401 |
| 2012/0106876 A1* | 5/2012 | Pawloski ............. B65D 33/255 383/97 |
| 2013/0000089 A1 | 1/2013 | Lee et al. |
| 2015/0043840 A1 | 2/2015 | Bois et al. |
| 2015/0049962 A1 | 2/2015 | Bois et al. |

* cited by examiner

FASTENING SYSTEM

CROSS-REFERENCE TO RELATED APPLICATION

The present application is a National Stage filing of International patent application Serial No. PCT/NL2015/050210, filed Apr. 2, 2015, and published as WO 2015/183075 A1 on Dec. 3, 2015, in English.

BACKGROUND

The discussion below is merely provided for general background information and is not intended to be used as an aid in determining the scope of the claimed subject matter.

Aspects of the invention relate to a fastening system, more in particular a fastening system comprising two individual profiles, hereafter also referred to as 'profile parts', by which a releasable connection may be made by mutually connecting the profile parts in a clamping manner.

Such fastening systems are known and are used for various purposes.

By pressing the two profile halves into each other, the ribs clamp in the clamping holes provided therefore on the other profile part and a safe connection is created that is releasable if the material is sufficiently elastic. Such a fastening system may be built from two identically shaped (symmetrical) profile parts or two differently shaped profile parts that are usually named male part and female part, depending on the shape of the respective profile part. The profile with a bulge is usually named the 'male' and the profile with a cavity is usually named the 'female'. In profiles that are identical in shape, the naming as male and female is interchangeable.

Where in this document "profile part" is written, either male profile or female profile is referred to.

Fastening systems such as these are used for fastening, or more in particular, for the releasable closing of bags. A very well-known fastening is the "Minigrip" fastening which is applied in reclosable plastic bags, the so-called grip bags. Patent document US 2012014622 shows an embodiment of a Minigrip reclosable plastic bag. The original Minigrip reclosable plastic bag profile, which is the basis for the fastener of said bag, is known from U.S. Pat. No. 4,858,286. Various variants to this profile are known.

Patent document U.S. Pat. No. 3,338,285A discloses a packaging with a pressure closing, provided with elongated gripping profiles. U.S. Pat. No. 7,743,474B2 also discloses a system comprising elongated profile parts that grip into each other for obtaining a closing connection.

These known closings have the problem that the mutual positioning of two elongated profile parts in the longitudinal direction of the profile, is troublesome. A fastening system having two profile parts may for example be used for connecting a holder, provided with the one profile part, to a carrier, provided with the other profile part of the fastening system. The disclosure aims in particular at the mounting of several holders (for example plastic bags or boxes) to a surface that functions as a carrier, and wherein it is important to fasten the bags or boxes at a specific distance from each other (next to or below each other) on the carrier. With an elongated profile having a standard shape, this is difficult.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background. The invention has a goal to solve this problem and realizes this by providing a fastening system with which it becomes possible to position said connections comprising two profile halves during the fastening. The invention does so with the aid of the profiles having deformations comprising recesses and elevations.

In the invention, deformations in a rib respectively a clamping hole of both profile parts are included, which deformations are suitable to obtain co-operation between the profiles in order to force each other into a specific mutual position, in the longitudinal direction of the profiles.

The profile of a fastening system in which ribs are clamped into clamping holes, is characterized by a specific height, known as rib height. When the two cooperating profile parts of the fastening system are brought together for fastening them, then the bringing together is hindered by this rib height, in other words, the height at which the openings of the clamping holes are located. The fact that the two profile parts are not parallel hinders the pressing together even more.

When the position where both profile halves mutually engage has to be selected very precisely, it becomes difficult to press the profile halves into each other. This is especially the case when the ribs and clamping holes are relatively narrow, or the number of ribs is small (for example, only one or two).

These problems occur in many reusable fastening systems and in particular in a Minigrip reclosable plastic bag profile. In particular when a standard Minigrip reclosable plastic bag profile comprising only one or two ribs is applied in two parts that are located at a distance from each other, the problem is that it is difficult to make the connection. This leads to discomfort in use, loss of time and possibly also a bad closing or fastening.

The invention also has as a goal to solve these problems and realizes this goal by providing a fastening system that establishes said connections comprising two profile halves faster and more easily and allows for a better positioning preceding the fastening action.

By the addition of a guiding edge to a profile part, it becomes possible to position one profile part more easily to the other profile part for clamping it. The male profile may clamp the female profile and vice versa, male profile and female profile may also be identical in shape, such that they clamp each other. These options are equal for the features of the invention. Essential is the positioning of a rib of the one profile in front of or in a clamping opening of the other profile.

In an embodiment of the invention, a sliding edge is added to the female profile, of which sliding edge the thickness increases towards the clamping hole. As a result, the male profile may be brought into the appropriate position in two steps, preceding the fastening, by laying it against the outside of the female profile and moving it gradually towards the clamping hole over the ramp created by the increasing thickness of the sliding edge. During this process, at a certain moment, the two profile parts are parallel to each other and the first rib of the male profile attains a position in front of the first clamping hole of the female profile, in which clamping hole the rib will sink somewhat in a preferred embodiment of the invention.

By such a modification to one of the profile parts or to both profile parts, it becomes possible to position the one profile with respect to the other profile preceding to the clamping, that a rib becomes located substantially parallel to and essentially precise in front of the opening of a clamping hole meant for the purpose. As soon as a first rib is positioned in front of a clamping hole, it becomes very easy to position this first rib and also possible other ribs into the clamping hole(s). The fastening is done by pressing the first rib into the first clamping hole, by which possible other ribs follow this movement easily.

An advantage of the invention lies in the quick and accurate positioning of both profile parts and subsequently being able to close the fastening quick and well. This advantage is the largest for profiles with narrow ribs, a small number of ribs and clamping holes and profiles having a narrow profile part in comparison to the length thereof. The invention is in particular suited for improvement of a Minigrip reclosable plastic bag profile that is already known in many kinds and sizes.

BRIEF DESCRIPTION OF THE DRAWINGS

Aspects of the invention will now be illustrated on the basis of the drawings, in which a few embodiments of the invention are shown as examples.

DETAILED DESCRIPTION OF THE ILLUSTRATIVE EMBODIMENTS

Figure 1:
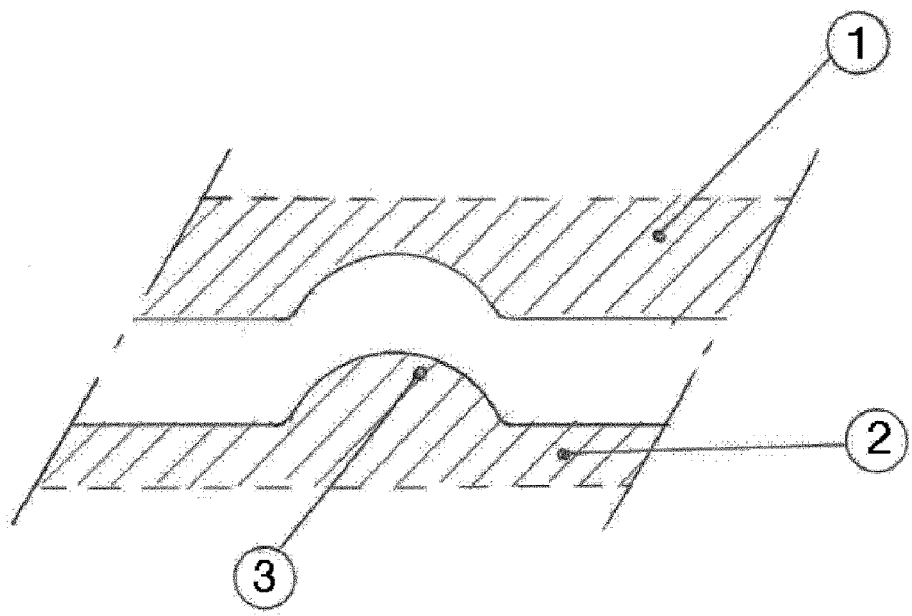
FIG. 1: shows an embodiment in which the profile parts comprise a deformation that extends in longitudinal direction and has a waveform.

FIG. 1 shows an embodiment of the invention, in which both profile parts (1) and (2) in the longitudinal direction thereof have a deformation (3) that extends over a specific length, which is realized as an elevation with a waveform in this example. Already before or during the pressing together of both profile parts such a waveform guides both parts that cooperate towards the desired position in the longitudinal direction of the profile. After pressing together both halves, the same deformation prevents a relative movement of the profile parts with respect to each other in the longitudinal direction. This thus has a double advantage. When the fastening system is applied to a holder and carrier, as outlined before, the positioning or centering is made easier, and accurately secures the position of holder with respect to carrier.

A waveform is one of the many possibilities for such a deformation according to the invention. A more elliptical shape or ball shape is also conceivable. It is essential that the deformation helps in positioning the profiles with respect to each other in the longitudinal direction and to maintain the position.

Figure 2:
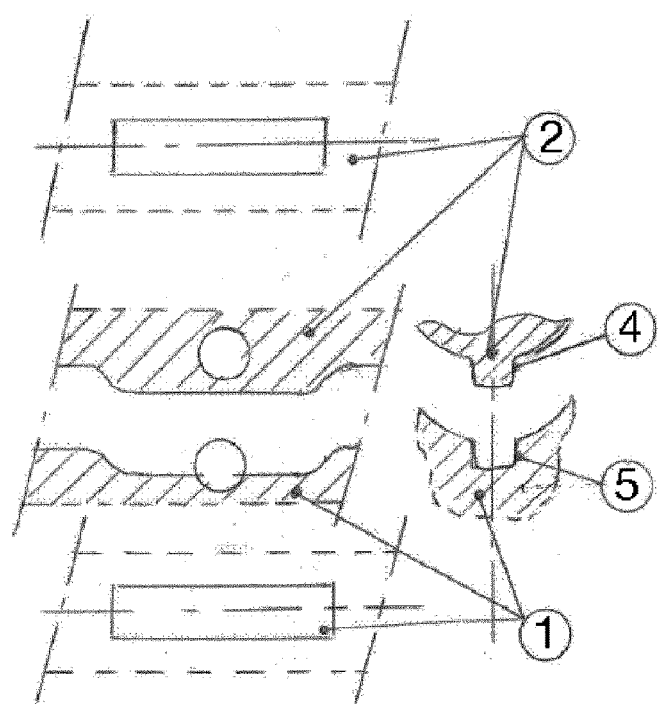
FIG. 2: shows an embodiment of the invention in which the profile parts comprise a crest and over a certain length and a corresponding indentation.

FIG. 2 shows as a variant hereto an embodiment of the invention in which the profile parts (1) and (2) comprise a deformation over a certain length in the shape of a crest (3) and a corresponding recess (5). A thickening in the one profile part and a corresponding thinning in the other profile part is another possibility.

Figure 3:
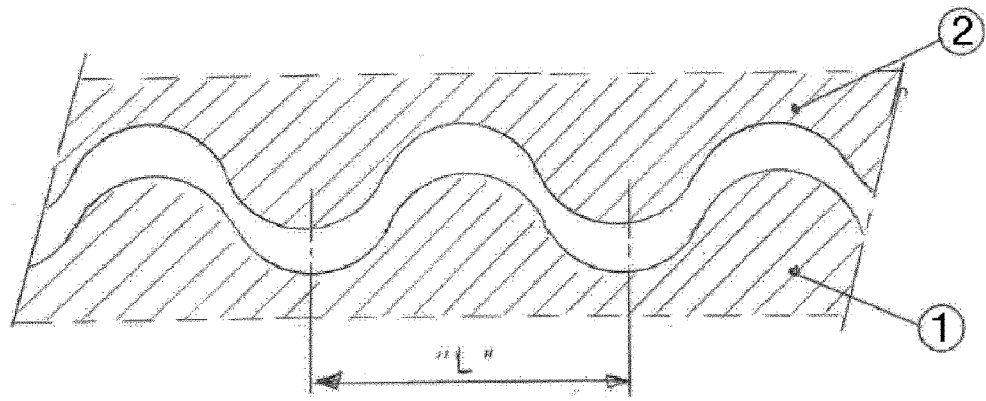
FIG. 3: shows an embodiment in which the profile parts comprise a deformation that repeats over a certain length.

The invention relates both to a single deformation that is realized at a single specific position in both profile parts and to a regularly repeating pattern of deformations. FIG. 3 shows an embodiment of the invention in which both profile parts (1) and (2) comprise a repeating deformation over a certain length, which in this example is a waveformed elevation with a wavelength "L".

Figure 5:
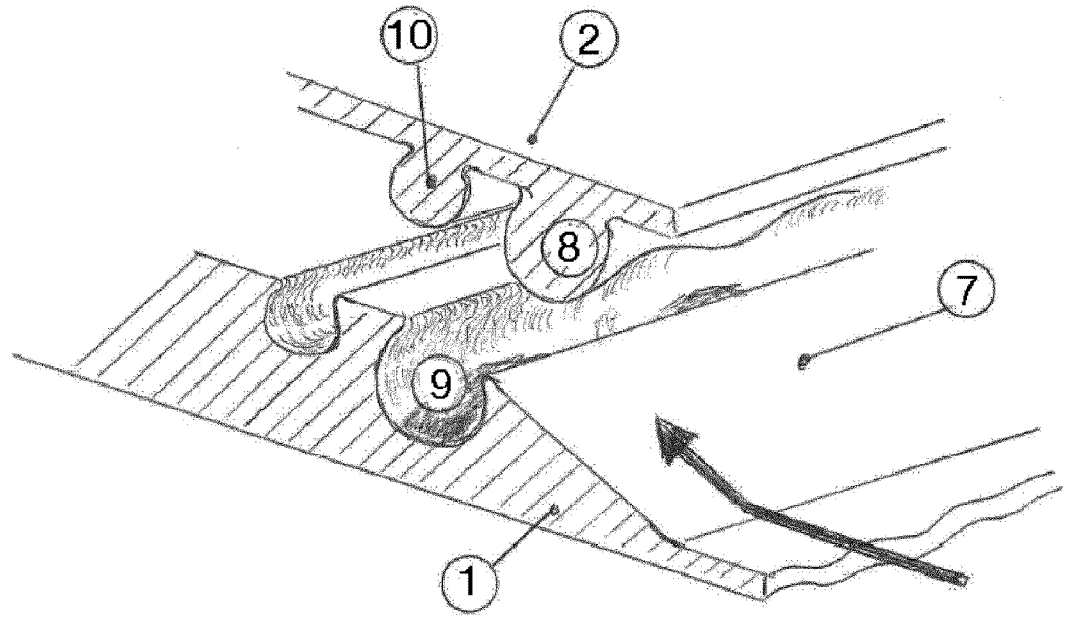
FIG. 5: shows a partial side view of an embodiment in which the profiles comprise an upright stop rim.

In FIG. 5 this deformation is visible, and it is also visible on the rib (8) of the male profile (2), which is positioned above the female profile (1) in this figure.

Known profiles have the disadvantage that the precise positioning with a certain tolerance in the longitudinal direction is difficult. By repeating the deformation, the fastening system is given the property that the profile parts are capable of reaching a next secured position located at a certain distance of a first secured position and can be secured thus with a certain precision. This offers a flexible manner of using the fastening system for positioning of a holder on a carrier with a specified fixed tolerance and interval at moving of the holder with respect to the holder in the longitudinal direction of the profile.

This feature is certainly not limited to an elevation having a waveform. Various embodiments are possible, wherein among other things the shape of the elevation, the length of the elevation and the distance over which the deformation is repeated. Each deformation that is suited for this purpose may be repeated over a certain distance in the profile parts. The wavelength by which the deformation is repeated in this case determines the shortest distance between two possible securing positions. The wavelength is inverse proportional to the accuracy of positioning and centering.

It is important that the distance between the repeated deformations, named the wavelength, is each time exactly identical and the deformations in both profile parts are accurately tuned to each other for cooperating in a suitable manner.

Figure 4:
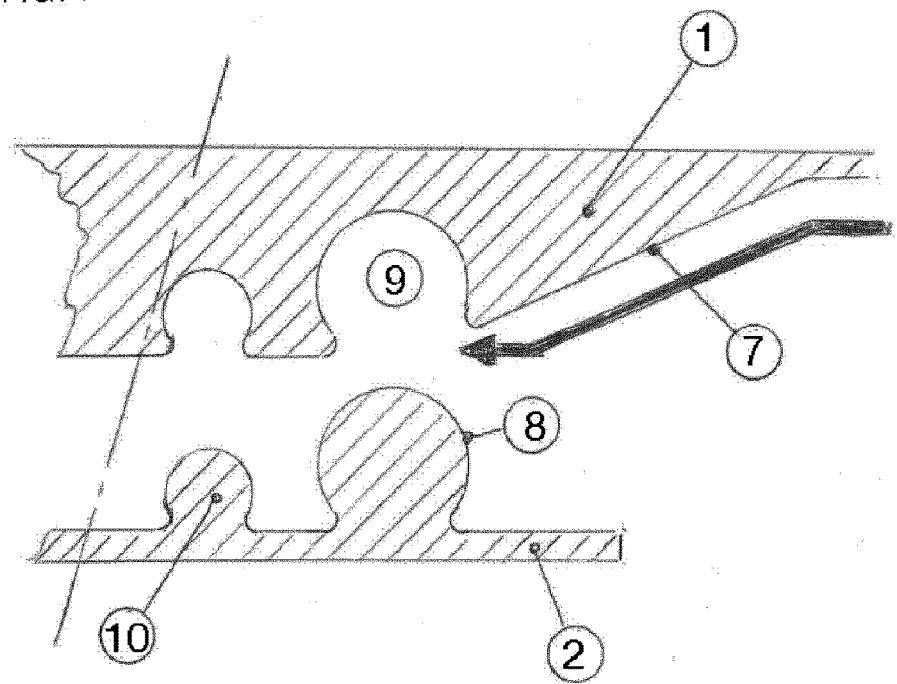
FIG. 4: shows a cross-sectional view of an embodiment in which the profiles comprise a sliding edge.

FIG. 4 is a cross-section and FIG. 5 is a partial side-view of both profile parts. In this embodiment, a female profile (1) and a male profile (2) are shown in cross-section. In this embodiment of the invention, a sliding edge (7) is fixed to the female profile. This sliding edge is shaped such that its thickness increases towards the first rib (8). When the two profile parts are attached to each other, a first rib (8) of the male profile may be brought in position over the sliding edge (7) in the direction of the broken arrow, until it is located precisely opposite the opening of a first clamping hole (9) of the female profile. Depending on the design and in particular the shape of the rib and the clamping hole, the rib will more or less descend into the clamping hole by itself. When the connection between this first rib and first clamping hole is made subsequently, by pressing together, possible next ribs (10) may be brought easily into the corresponding next clamping holes, since these have been positioned automatically in the right manner for this purpose.

In an ideal case, the elasticity of the material of ribs and/or clamping holes allows the profile parts to be connected mutually in a tightly wedged and releasable manner. However, the invention is also suited for profiles serving for creating a permanent connection.

In another embodiment, an upright stop edge is provided to the outer limitation of one profile part or both profile parts, which stop edge prevents during a shift in lateral direction of one profile part with respect to the other profile part that the profile parts move further with respect to each other, and in such a manner that the first rib is brought precisely opposite the opening of the first clamping hole.

Figure 6:
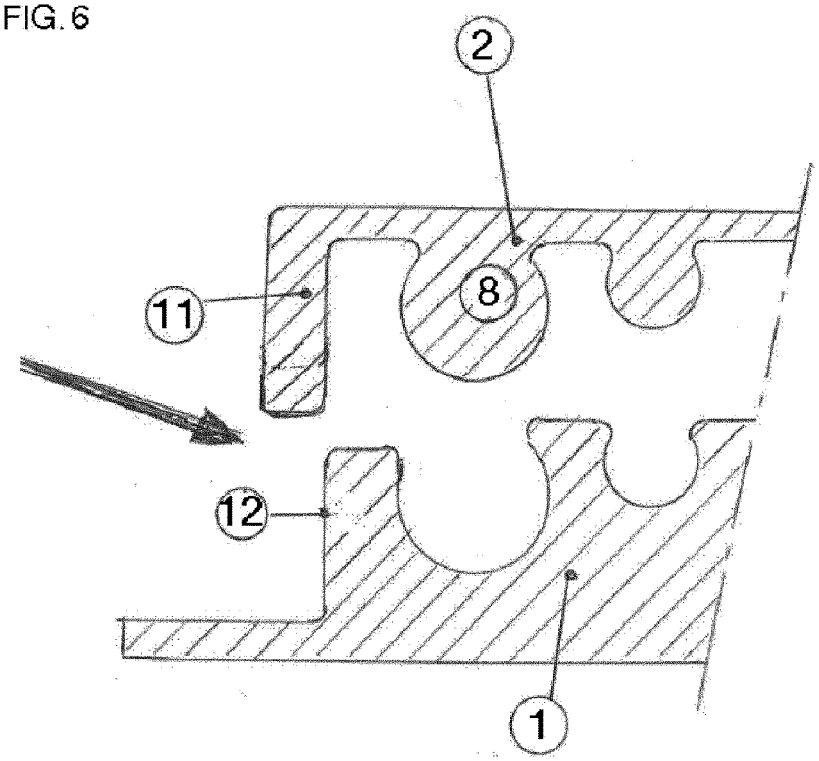
FIG. 6: shows a cross-sectional view of an embodiment in which the profiles comprise an upright stop rim.

FIG. 6 shows such an embodiment of the invention. In this example, two profile parts (1) and (2) are shown in cross-section. In this embodiment, two profile parts (1) and (2) are shown in cross-section. In this embodiment, a stop rim (11) that extends over a certain length is fastened to profile (2). By this stop rim, profile (2) may be shifted in the direction of the arrow over profile (1), until the stop rim (11) touches the side (12) of the other profile. In a dimensioning according to the invention, in this position both profile will be parallel opposite to each other, wherein ribs and clamping holes of both profiles are abutting each other for being clicked into each other.

The minimal height of the stop rim can easily be determined by experiments. For a good operation, it is important that the upright stop rim (11) protrudes higher than the first rib (8) of the profile.

The upright stop rim has as an additional advantage that it provides a higher stiffness to the profile part (2). This makes torsion or bending of the profile part more difficult and prevents it from deformation that would make it fit less well.

The principle of the invention as shown here on the basis of an asymmetrical male/female profile is certainly not limited to these profile shapes. The invention is also applicable to other profile shapes, among which those that comprise almost identically shaped or symmetrically shaped profile parts, in particular to a Minigrip reclosable plastic bag profile.

Various variants and additional features are conceivable that realize or further improve the desired solution. A guiding rim or upright rim may be provided to the other profile part or to both profile parts. Such a rim may be shaped and dimensioned in various manners. It is important that the movement of the one profile with respect to the other profile is somewhat guided, such that in the end a first rib is brought almost opposite to or partly in a first clamping hole, before the profile parts are brought together for finishing the clamping connection.

Further advantages may be obtained by the addition of further ribs and clamping holes to the profile parts, which leads to a wider profile. The first rib then also serves to position and to enable the first fixation; subsequent ribs serve to provide closing—or pulling force to the connection.

The advantage of further ribs is shown in particular when a higher pulling force needs to be exerted in the plane of the profile, perpendicular to the longitudinal direction of the profiles, directed away from the first rib in the direction of the next rib. This is for example the case when a holder having some weight, such as a filled grip bag or a box, is suspended to a carrier by means of such a fastening system.

In cases where small or narrow profile parts are involved that are difficult to position mutually, a first, larger rib will be more effective for the positioning.

A further improvement is obtained by a first rib that extends from the longitudinal surface less than possible second and further ribs. This has the advantage that the profile parts find each other even more easily during the positioning.

The features of the invention leads to an improved method for fastening two profile parts (or for example a holder and a carrier by which these are connected) with the aid of a said fastening system. Preceding the step of clicking to fix, the features of the invention enable an optimal relative positioning of these profile parts or the carrier and holder of which these profile parts are part, with respect to each other. This enables applications such as a hanging or storage system in which holders, such as a bag or a box, can be fixed to a carrier in an easy manner without problems in the exact positioning of both parts of the connection preceding the making of the connection.

The advantages of the invention are especially done justice when these are applied in a fastening system for grip bags or other carriers. In such bags, in particular grip bags, small items such as beads, metal pieces and also food may be packaged in a closed and reopenable manner. Such bags have the disadvantage that it is difficult to store them in a neatly arranged manner, to organize them and to retrieve them. By means of the fastening system of the invention such bags may easily be fastened on a carrier in order to store them in a suspended or lying manner.

Figure 7:
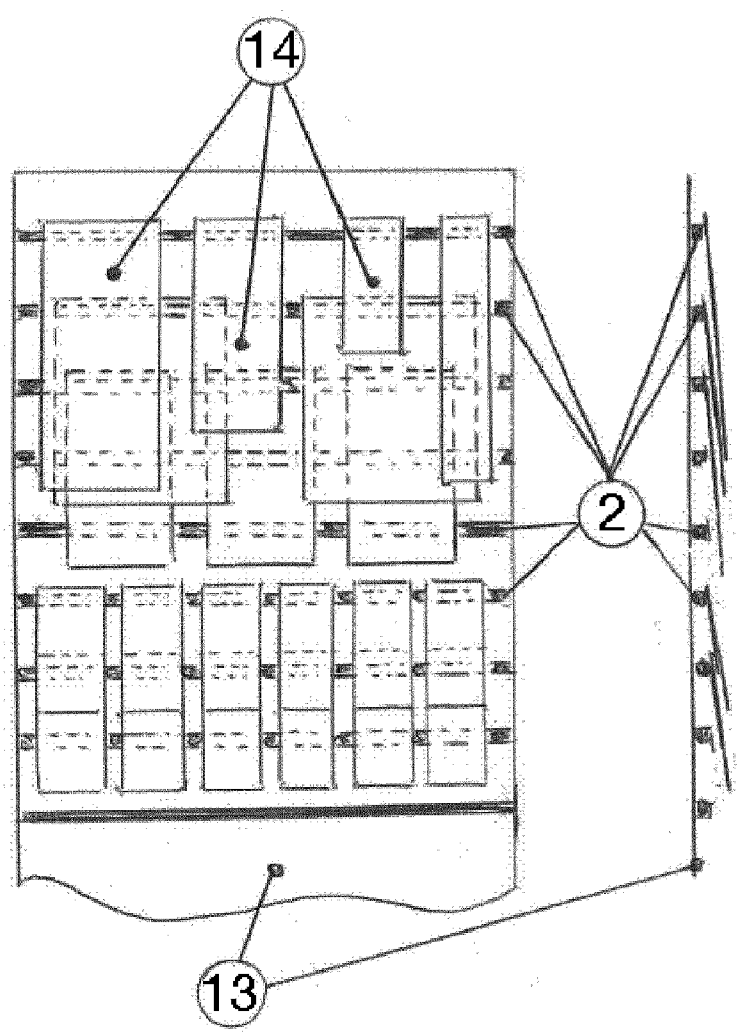
FIG. 7: shows a carrier provided with female profile parts with holders fixed thereto, in particular bags, provided with male profile parts.

FIG. 7 shows an example of a front view and a side view of a carrier (13), in this case a sheet of, for example, the size A4, which sheet is provided with parallel female profile parts (2); having fixed thereto a number of holders (14), in this example storage bags provided with a male profile part. Such a carrier may for example be made of flexible plastic and also be provided with a perforation for mounting or suspending it in a loose-leaf file. The invention enables a very easy positioning and fastening of the bags on the carrier.

The side view in FIG. 7 shows how the bags (14) become lying or hanging over each other, by mounting a number of profile parts (2) parallel to each other on the carrier (13), which allows for an efficient use of the storage space. The bags may have the same sizes or different sizes.

The manner of fastening and organizing provided by the invention has as an advantage that space is saved, that the holders or bags may be stored and sorted in an organized manner and may also be retrieved easily.

The invention also provides a storage system wherein other kinds of carriers, such as for example boxes, are fastened to a carrier.

Figure 8:
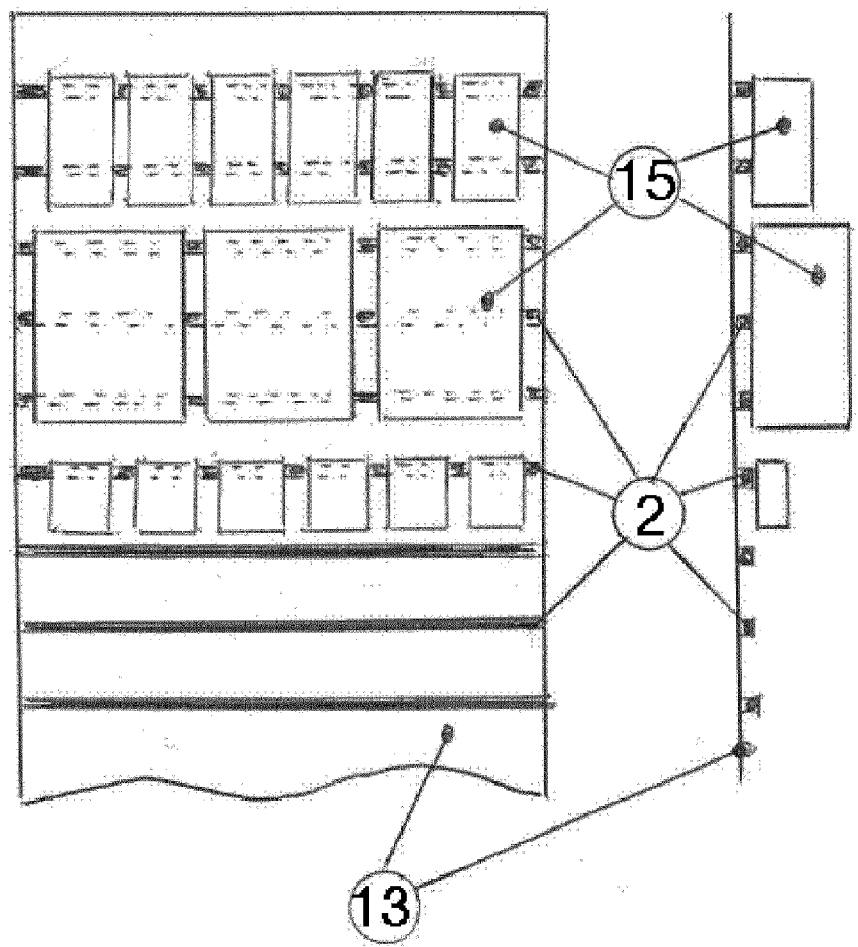
FIG. 8: shows a carrier provided with female profile parts with fixed thereto a number of holders, in particular boxes, provided with male profile parts.
Figure 9:
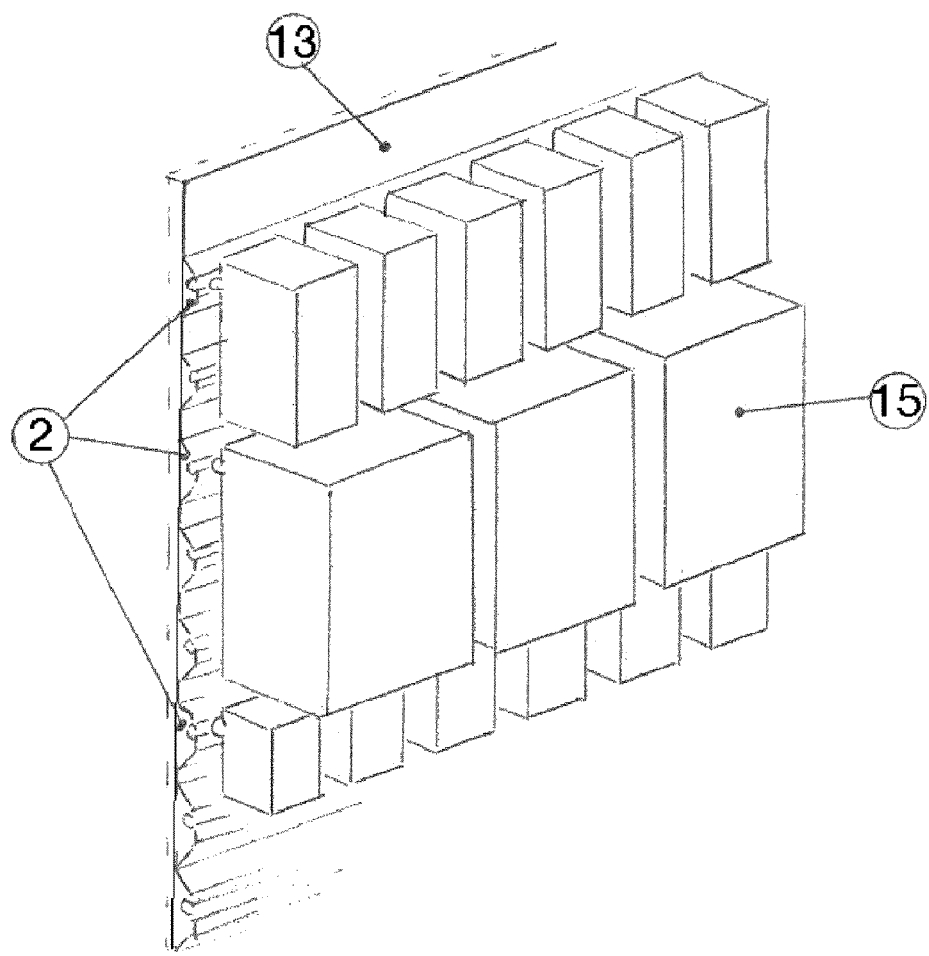
FIG. 9: shows a partial side-view of a carrier provided with female profile parts having a number of holders attached thereto, in particular boxes, provided with male profile parts.

FIG. 8 shows a carrier (13) provided with female profile parts (2) having a number of boxes (15) fixed thereto that are provided with male profile parts. FIG. 9 shows a partial side view of such an embodiment. The boxes (15) may for example be composed of plastic. The side view in FIG. 8 shows how such boxes become lying or hanging parallel with the carrier, when several parallel profile parts (2) are incorporated on the carrier (13), since these are supported by the other profiles whereto the box is not fastened. The boxes may have different or identical sizes.

In the manner shown before, the invention provides a widely applicable storage system that has the advantage that the holders applied therein, in particular bags or boxes, may be stored and retrieved very fast, easily and precisely.

Especially for Minigrip (also known as Griplock) reclosable plastic bags and all storage bags comparable thereto the invention offers advantages. Such bags are provided with a closing edge at their top side wherein a closing profile is provided. Reclosable bags such as these occur frequently in various kinds and sizes and show problems with respect to the organization of the storing thereof. A variant of the invention is arranged to add an additional profile part at the outside of a reclosable box that is known per se, for example on the outside of the upper closing edge. This additional profile part may be a normal Minigrip reclosable plastic bag profile part or an improved profile part of the fastening system according to the invention. Due to the addition of this additional profile part, the bag may be fastened to a carrier with a corresponding profile part. This has as an advantage that a bag may easily be stored and retrieved in a storage system for such bags.

Figure 10:
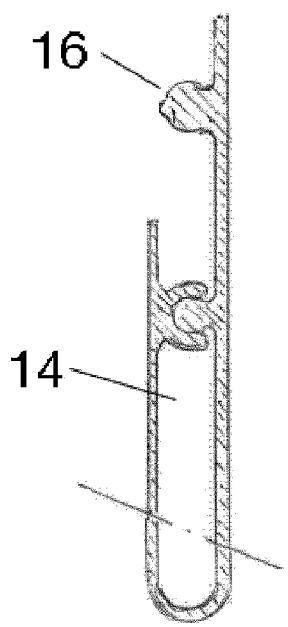
FIG. 10: shows a Minigrip reclosable plastic bag provided with an additional profile part at the outside of the closing edge.

FIG. 10 shows a Minigrip reclosable plastic bag (14), provided with an additional profile part (16).

Figure 11:
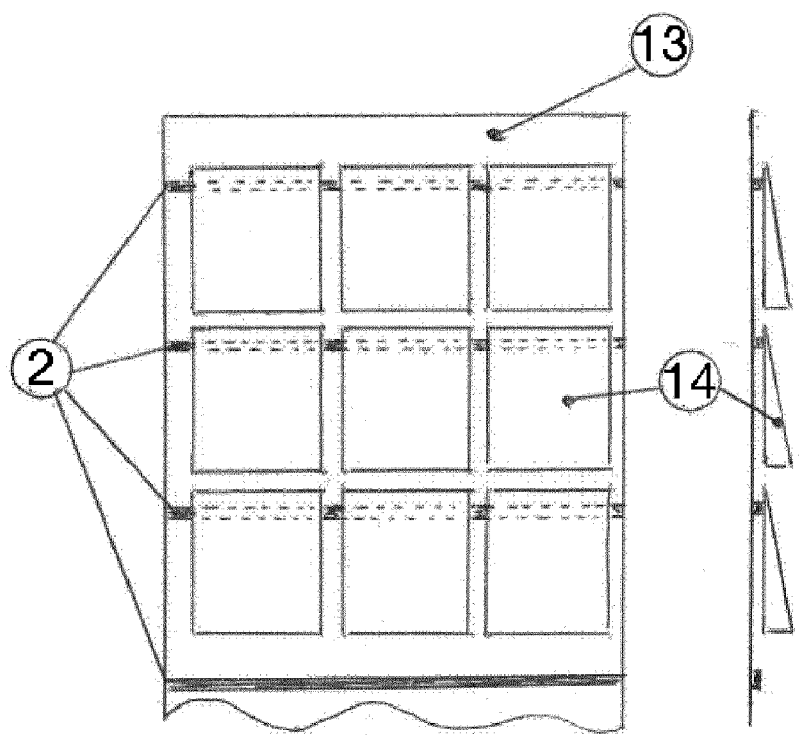
FIG. 11: shows an example of a carrier with a number of Minigrip reclosable plastic bags attached thereto.

FIG. 11 shows an example of a carrier with profile parts (2) and a number of Minigrip reclosable plastic bags according to the invention fastened thereto.

Further, the invention proposes to provide the rear side of a profile part with a self-adhesive layer, the profile part may therein be a known profile part such as a Minigrip reclosable plastic bag profile part or an improved profile part according to the invention. As a result, the profile part may easily be glued onto each desired carrier or holder, which thereby becomes suitable for being fastened according to the principle of the invention.

A further advantage of this is that the profile may also be mounted on surfaces with a non-straight shape, for instance a pillar. Subsequently, holders may be fastened thereto.

A profile part may also be part of or be connected to a strip that is mounted on a fixed surface such as a wall. Such a strip may for example be made of plastic or metal. By providing a certain color to the strip or by making it transparent instead, it may be adapted to the color of the environment.

A strip provided with a profile part may be provided with fastening means in various manners, such as for example a sticking strip, a magnetic strip or screw holes, by which a permanent fastening is made possible to a surface or a carrier.

Profile parts may have all kinds of lengths and widths and may be provided with one, two or more ribs respectively clamping holes, in order to determine the maximal closing or pulling force therewith and to optimize the shape for the type of holder or carrier.

Figure 12:
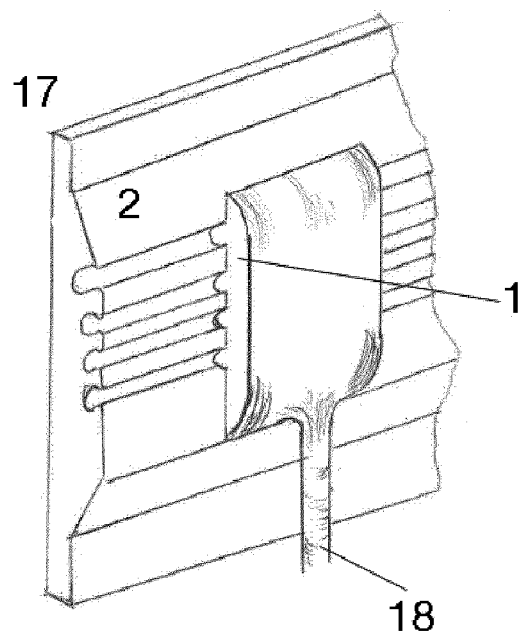
FIG. 12: shows a wall mounting system, in which a female profile is mounted on a wall and a male profile on a hanger and the profiles are provided with additional ribs and clamping holes.

As a last example of a possible embodiment of the invention, FIG. 12 shows an example of a wall mounting system wherein a female profile, hereafter named wall strip, is fastened in a durable manner to a wall (17) and a male profile is connected to a hanger (18). The hanger may for example serve to suspend a painting. The wall strip is in this example integrated with the profile as a single unit, but may also be made of a separate strip, for example of plastic or metal, which is durably connected to the female profile. The wall strip as a whole may, when in use, be fastened on a wall or other surface with a nail or screw connection, for instance with a self-adhesive layer.

FIG. 12 shows an example of a profile with additional ribs and clamping holes. This enhances the pulling force of the clamping connection in a vertical direction. This is particularly beneficial in applications where pulling force in vertical direction needs to be absorbed, such as in said example of a wall fastening system.

Due to their elongated shape, it is difficult to store and save the individual profile parts described above according to the invention. The invention proposes to pack and save profile parts in a curled up manner. This allows for a very simple manner of storage and use. In a simple manner a part of the profile part may be cut off. The advantages are in particular present in variants having a self-adhesive of magnetic surface.

A profile part may be provided with perforations in the lateral direction, which allows for an easy tearing or breaking at a certain length.

Above it is elaborated that the invention proposes various features aiming at the positioning of the profile parts preceding the creation of the connection there between. Other features of the invention may be applied in combination with these first mentioned features and also individually.

A carrier or holder already provided with a known closing or fastening system (such as a Minigrip reclosable plastic bag) may be provided according to the invention with an additional profile part in order to allow thereby a fastening to a carrier or holder provided with a similar profile part.

The invention also claims any combination of a carrier provided with a suitable profile part and a holder that, apart from profile parts needed for closing the holder, is provided with an additional profile part to fasten the holder in a suspended or lying manner to the carrier.

For example, also claimed is a Minigrip reclosable plastic bag provided with an additional Minigrip reclosable plastic bag profile for allowing a fastening of the bag to a carrier that is provided with a matching profile.

Any holder mentioned above may have various shapes and be made of various materials, for example a Minigrip reclosable plastic bag or other storage bag, a box or another type of holder intended to comprise for example small parts, beads, powder, food, et cetera.

Any carrier mentioned above may have various shapes and may be made of various materials, for example a plastic sheet, a wall board, a self-adhesive strip, et cetera, intended to organize, store or suspend said carrier.

The description and figures serve as illustrations of the many possible embodiments and are not intended for limiting the number of possible applications.

The invention claimed is:

1. A fastening system for joining a first element and a second element, comprising:
    an elongated female profile of elastic material on the first element comprising a number of parallel elongated ribs extending from a first longitudinal surface of said elongated female profile of elastic material and at least one clamping hole formed between said elongated ribs, and
    an elongated male profile on the second element comprising an elongated rib extending from a second longitudinal surface thereof,
    wherein said female profile is arranged to cooperate with the male profile to clamp said male profile in a releasable manner,
    wherein one of the ribs of said female profile comprises a ramp configured to support manual positioning of the elongated rib of the male profile for clamping the elongated rib in a first clamping hole of the at least one clamping hole of the female profile, the ramp extending from the first longitudinal surface to a top surface of the first rib adjoining an opening to the first clamping hole, the ramp having a thickness that increases with distance toward the first clamping hole, and wherein the elongated rib of the male profile comprises deformations including a recess and an elevation.

2. The fastening system according to claim 1, wherein a bottom surface defining a portion of the at least one clamping hole of the female profile includes deformations that conform to the deformations of the elongated ribbon of the male profile.

3. The fastening system of claim 2, wherein the elongated male profile extends in a longitudinal direction on the second element, and the deformations of said elongated rib of the male profile include changes in a thickness of said elongated rib of the male profile with a change in position along the longitudinal direction.

4. The fastening system of claim 3, wherein the deformations of said female profile comprise a change in a position of the bottom surface of the at least one clamping hole relative to the first longitudinal surface with a change in position along the longitudinal direction.

5. The fastening system according to claim 2, wherein said deformations are displaced from each other along a longitudinal direction.

6. The fastening system according to claim 5, wherein said deformations are identical in shape and are included in a repeating manner over a certain length in the longitudinal direction of the profiles each with identical mutual distances.

7. A carrier or holder, provided with a profile of a fastening system, the fastening system comprising:
one of:
an elongated female profile comprising a number of parallel ribs extending from a longitudinal surface of said elongated female profile and at least one clamping hole formed between said parallel ribs, the elongated female profile arranged to cooperate with a received elongated male profile, the received elongated male profile having a received elongated rib, the female profile comprising a deformation, which is configured to a corresponding deformation on the received male profile to position the received male profile in a substantially clamped state in the female profile in a longitudinal direction thereof; and
an elongated male profile, comprising an elongated rib extending from a longitudinal surface thereof, the elongated male profile arranged to cooperate with a received elongated female profile, the received female profile comprising a number of parallel ribs extending from a longitudinal surface of said elongated female profile and at least one clamping hole formed between said parallel ribs, the male profile comprising a deformation, which is configured to a corresponding deformation on the received female profile to position the received female profile in a substantially clamped state in the male profile in the longitudinal direction thereof;
wherein one of the ribs of said female profile comprises a ramp configured to support manual positioning of the elongated rib of the male profile for clamping the elongated rib in a first clamping hole of the at least one clamping hole of the female profile, the ramp extending from the first longitudinal surface to a top surface of the first rib adjoining an opening to the first clamping hole, the ramp having a thickness that increases with distance toward the first clamping hole.

8. The carrier or holder according to claim 7 made of flexible material.

9. The fastening system of claim 1 wherein one of the elements comprises a carrier and holder.

10. The fastening system according to claim 1, wherein the male profile or the female profile comprises a third longitudinal surface that is located opposite the surface from which a rib or clamping hole projects, wherein said third longitudinal surface is self-adhesive configured to connect to an individual holder or carrier for use.

11. The fastening system according to claim 1, wherein the male profile or the female profile comprises a third longitudinal surface that is located opposite the surface from which a rib or clamping hole projects, wherein said third longitudinal surface is magnetic configured to connect to an individual holder or carrier.

12. The fastening system of claim 1 wherein one of the elements comprises a bag.

13. The fastening system of claim 12 wherein one of the elements comprises a carrier or holder.

14. A fastening system for joining a first element and a second element, comprising:
an elongated female profile of elastic material extending in a longitudinal direction on the first element comprising a number of parallel elongated ribs extending from a first longitudinal surface of said elongated female profile of elastic material and at least one clamping hole formed between said elongated ribs, and
an elongated male profile extending in the longitudinal direction on the second element comprising an elongated rib extending from a second longitudinal surface thereof,
wherein said female profile is arranged to cooperate with the male profile to clamp said male profile in a releasable manner, and
wherein the elongated rib of the male profile and the at least one clamping hole of said female profile both comprise deformations, the deformations of said elongated rib of the male profile include changes in a thickness of said elongated rib of the male profile with a change in position along the longitudinal direction, and the deformations of said female profile comprise a change in a position of a bottom surface defining a portion of the at least one clamping hole relative to the first longitudinal surface with a change in position along the longitudinal direction.

15. The fastening system according to claim 14, wherein one of the ribs of said female profile comprises a ramp configured to support manual positioning of the elongated rib of the male profile for clamping the elongated rib in a first clamping hole of the at least one clamping hole of the female profile, the ramp extending from the first longitudinal surface to a top surface of the first rib adjoining an opening to the first clamping hole, the ramp having a thickness that increases with distance toward the first clamping hole.

16. The fastening system according to claim 14, wherein one of said female profile and said male profile include a guiding surface configured to support manual positioning of the elongated rib of the male profile for clamping the elongated rib in the at least one clamping hole of the female, the guiding surface including a stop rim, located against an outside of the male or female profile and parallel to the first longitudinal surface of said female profile or the second longitudinal surface of the male profile, wherein the stop rim rises higher above the corresponding first or second longitudinal surface than a nearest rib of said corresponding male or female profile.

* * * * *